US009348411B2

(12) United States Patent
Paek et al.

(10) Patent No.: US 9,348,411 B2
(45) Date of Patent: May 24, 2016

(54) OBJECT DISPLAY WITH VISUAL VERISIMILITUDE

(71) Applicant: Microsoft Corporation, Redmond, WA (US)

(72) Inventors: Timothy S. Paek, Sammammish, WA (US); Johnson Apacible, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 13/901,599

(22) Filed: May 24, 2013

(65) Prior Publication Data

US 2014/0347262 A1 Nov. 27, 2014

(51) Int. Cl.
G09G 5/00 (2006.01)
G06F 3/01 (2006.01)
G06F 3/0481 (2013.01)
G06T 15/20 (2011.01)
G09G 3/20 (2006.01)
G09G 5/32 (2006.01)

(52) U.S. Cl.
CPC ............ *G06F 3/013* (2013.01); *G06F 3/04815* (2013.01); *G06T 15/20* (2013.01); *G09G 3/20* (2013.01); *G09G 5/32* (2013.01); *G09G 2340/0464* (2013.01)

(58) Field of Classification Search
CPC ..................................................... G06F 3/013
USPC ............................................................. 345/5
See application file for complete search history.

(56) References Cited

U.S. PATENT DOCUMENTS

| 8,009,022 | B2 | 8/2011 | Kipman et al. |
| 2004/0193413 | A1* | 9/2004 | Wilson et al. .................. 704/243 |
| 2007/0002130 | A1* | 1/2007 | Hartkop .................... 348/14.16 |
| 2008/0320126 | A1 | 12/2008 | Drucker et al. |
| 2010/0027832 | A1* | 2/2010 | Koseki ........................... 381/387 |
| 2010/0079449 | A1* | 4/2010 | McCarthy ..................... 345/419 |
| 2010/0302395 | A1 | 12/2010 | Mathe et al. |

(Continued)

FOREIGN PATENT DOCUMENTS

DE 202008015741 U1 6/2009
WO 2012/054063 A1 4/2012

OTHER PUBLICATIONS

Anthony, Sebastian., "IllumiRoom Peripheral Projection: Is this the Xbox 720's Killer Feature?", Retrieved at <<http://www.extremetech.com/gaming/146536-illumiroom-peripheral-projection-is-this-the-xbox-720s-killer-feature>>, Jan. 23, 2013, pp. 1-11.

(Continued)

*Primary Examiner* — Jason Olson
(74) *Attorney, Agent, or Firm* — Steve Wight; Sandy Swain; Micky Minhas

(57) ABSTRACT

Described herein are technologies relating to display of a representation of an object on a display screen with visual verisimilitude to a viewer. A location of eyes of the viewer relative to a reference point on the display screen is determined. Additionally, a direction of gaze of the eyes of the viewer is determined. Based upon the location and direction of gaze of the eyes of the viewer, the representation of the object can be displayed at a scale and orientation such that it appears with visual verisimilitude to the viewer.

20 Claims, 10 Drawing Sheets

(56) References Cited

U.S. PATENT DOCUMENTS

| | | |
|---|---|---|
| 2011/0025689 A1 | 2/2011 | Perez et al. |
| 2011/0177914 A1* | 7/2011 | Park .................................. 482/1 |
| 2011/0295693 A1 | 12/2011 | Clavin et al. |
| 2012/0127176 A1 | 5/2012 | Margolis |
| 2014/0146127 A1* | 5/2014 | He et al. ...................... 348/14.08 |
| 2014/0267771 A1* | 9/2014 | Lawler .......................... 348/169 |

OTHER PUBLICATIONS

Polydorou, Doros., "Immersion and Interaction: Creating Virtual 3D Worlds for Stage Performances", Retrieved at http://bura.brunel.ac.uk/bitstream/2438/6408/1/FulltextThesis.pdf>>, A Thesis Submitted for the Degree of Doctor of Philosophy, May 2011, pp. 1-130.

Cavazza, et al., "Interactive Storytelling in Virtual Environments: Building the "Holodeck"", Retrieved at <<http://citeseerx.ist.psu.edu/viewdoc/download?doi=10.1.1.19.8095&rep=rep1&type=pdf>>, in 6th International Conference on Virtual Systems and MultiMedia, Oct. 2000, pp. 1-11.

"International Search Report & Written Opinion for PCT Patent Application No. PCT/US2014/039259", Mailed Date: Aug. 4, 2014, Filed Date: May 23, 2014, 10 Pages.

Response to the Communication for European Patent Application No. 14733811.5, Filed Date: Feb. 17, 2016, 19 Pages.

* cited by examiner

OBJECT DISPLAY WITH VISUAL VERISIMILITUDE

BACKGROUND

Conventional telepresence applications and virtual environments often are perceived as being artificial in nature to users of such applications. For example, some conventional virtual reality applications require sensors to be attached to a user, including a head-mounted display, accelerometers that detect motion of the head or other portions of a body of the user, etc. This can result in a virtual environment feeling unnatural to the user. Similarly, conventional telepresence applications are deficient in that users thereof are provided with unnatural communications, as videos of participants in telepresence applications often include warped images and/or images that are scaled to fit on a display screen. Further, with respect to telepresence applications where two users are communicating by way of display screens and associated cameras, such cameras are typically displaced from the display screen, causing a first participant in a telepresence application to have the perception that the other participant is not looking at the face of the first participant; accordingly, the communications between the participants can feel unnatural.

As size of display screens continues to increase, and associate cost continues to decrease, the issues mentioned above will intensified. For example, with respect to a wall-sized display (e.g., a display with a screen diagonal length of several feet), utilizing conventional approaches, a face of a person with whom a viewer of the display is communicating via a telepresence application may be several feet in height and/or width. Similarly, objects displayed on such a display, using conventional display techniques, may be presented with a size that is not reflective of the actual size of the object.

SUMMARY

The following is a brief summary of subject matter that is described in greater detail herein. This summary is not intended to be limiting as to the scope of the claims.

Described herein are various technologies pertaining to displaying objects on a display screen with visual verisimilitude (e.g., a 1:1 correspondence scale/orientation with the object from the perspective of a viewer of the display screen). Displaying of objects on the display screen with visual verisimilitude can be accomplished by determining a location of the viewer of the display screen (e.g., relative to a reference point on the display screen) and further determining a direction of gaze of the eyes of the viewer. Based upon the location and direction of gaze of the eyes of the viewer, a representation of an object set forth on the display screen can have a 1:1 correspondence in scale, and be shown with an appropriate orientation, on the display screen to the viewer. Thus, the viewer can perceive the display screen as being a window, where the represented object is on the other side of the window, in that the represented object is shown with an orientation and scale as a function of location of eyes of the viewer relative to the object and direction of gaze of the viewer. In an exemplary embodiment, the viewer can change her location and/or direction of gaze to view the object at a different perspective and/or to view imagery not able to be seen from a previous location/direction of gaze. Again, this is analogous to the viewer peering through a window, such that as the viewer changes her location and gaze, imagery presented to the viewer likewise changes.

To accomplish the foregoing, as noted above, location of eyes of the viewer relative to a reference point on the display screen and direction of gaze of the viewer (e.g., elevation and azimuth angle) can be computed. In an exemplary embodiment, a sensor or array of sensors can be configured to output data that is indicative of the location of the eyes of the viewer in a three-dimensional coordinate system and/or the direction of the gaze of the viewer. For instance, the sensor or array of sensors can be or include, a video camera, an infrared camera, a depth sensor, etc. It can be understood that such sensors are nonintrusive in nature, in that the user need not wear additional hardware or manually indicate her location or direction of gaze. A representation of a graphical object that is to be presented on the display screen can then be output based upon the determined location of the eyes of the viewer in the three-dimensional coordinate system and the determined direction of the gaze of the eyes of the viewer. Accordingly, from the perspective of the viewer, the representation of the graphical object is displayed on the display screen with visual verisimilitude—with a scale and perspective as if the viewer were viewing the object through a window (rather than viewing a representation of the object on the display screen).

In an exemplary embodiment, represented objects displayed on the display screen can be or include programmatic graphical objects (e.g., virtual objects). For example, three-dimensional virtual objects can be retained in a computer-readable memory, and can be rendered on the display screen as a function of the location of the eyes of the viewer in the three-dimensional coordinate system and the direction of the gaze of the viewer. For instance, a virtual aisle of a grocery store can be displayed on the display screen, wherein the virtual aisle comprises a plurality of virtual items (e.g., a gallon of milk, a carton of juice, etc.). The virtual items can be programmatic items, in that they are pre-programmed representations of grocery store items. When displayed to the user, however, virtual items can be displayed with visual verisimilitude.

In another exemplary embodiment, a represented object can be an amalgamation of views of an object captured by several cameras (e.g., video cameras). For example, a plurality of video cameras can be positioned to capture overlapping views of an object, thereby capturing views of the object at different perspectives. Based upon the determined location of the eyes of the viewer in the three-dimensional coordinate system and the determined direction of the gaze of the viewer, portions of different images of the object can be stitched together and displayed on the display screen with visual verisimilitude to the viewer. Thus, the orientation and scale of the represented object can be updated in real-time as the location of the eyes of the viewer change and/or the direction of the gaze of the viewer changes.

In another example, a telepresence application can be configured to employ the technologies described herein. In such an application, a first person and second person communicate with one another by way of a first display and a second display. Video cameras in a first array of video cameras can capture respective images of the first person, and video cameras in a second array of video cameras can capture images of the second person. The location of the eyes of the first person in a first three-dimensional coordinate system is determined, as well as the direction of the gaze of the eyes of the first person. Images from the second array of cameras can be processed for display on the first display based upon the above-mentioned location and direction of gaze of the eyes of the first person, such that, when the first person is looking at a representation of the second person on the first display, the representation of the second person is shown with visual verisimilitude (e.g., as if the first person were looking at the second person through a pane of glass). Likewise, a location of the eyes of the second person in a three dimensional coordinate system and a direction of the gaze of the eyes of the second person can be determined, and images from the first array of cameras can be processed for display on the second display, wherein the images are processed based upon the location and direction of gaze of the eyes of the second person. Thus, when the second person views a representation of the first person on the second display, the second person is shown with visual verisimilitude (e.g., as if the second person were looking at the first person through the pane of glass).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
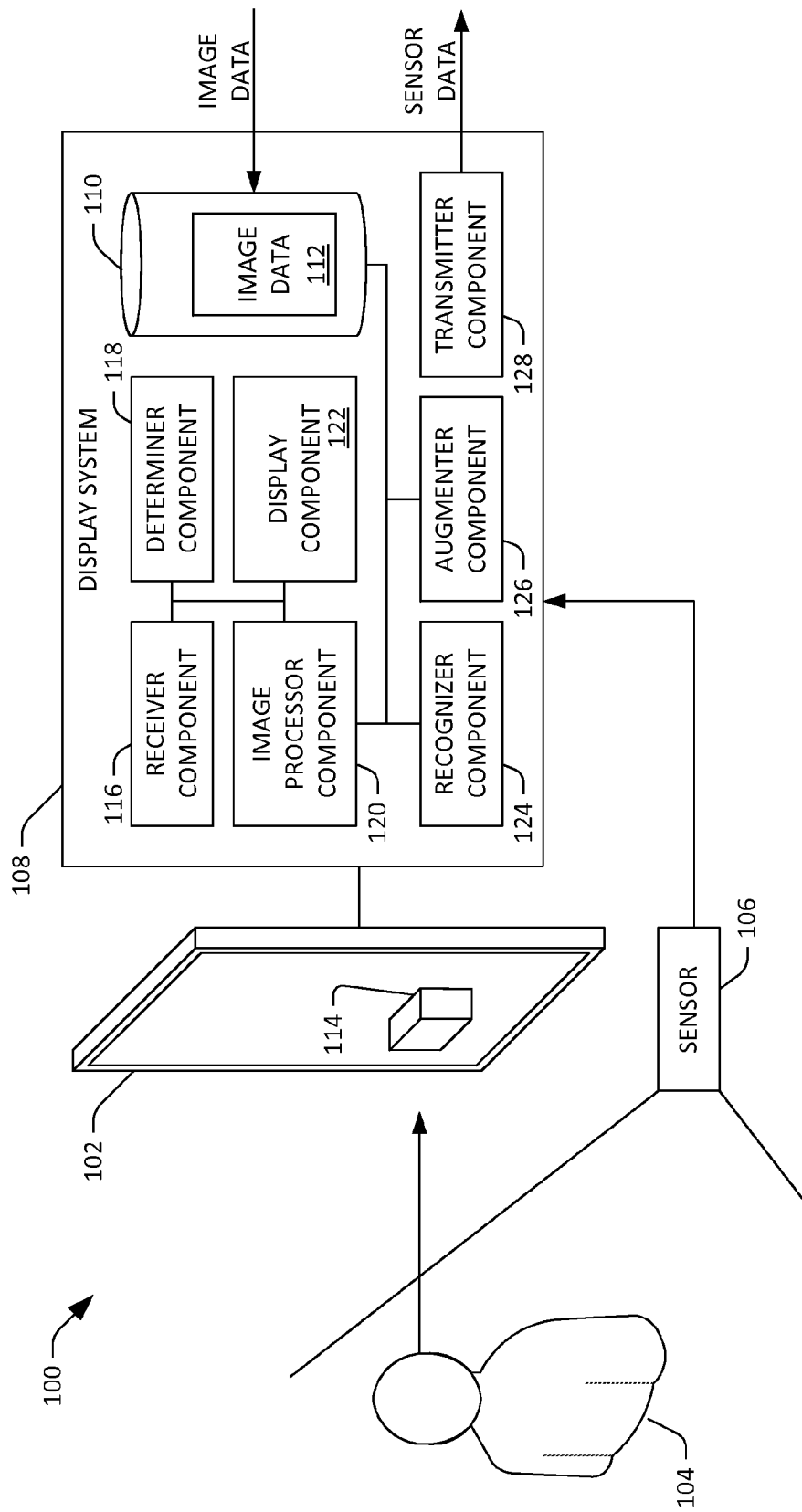
FIG. 1 is a functional block diagram of an exemplary system that facilitates presenting a representation of an object on a display with visual verisimilitude.

Various technologies pertaining to presenting representations of graphical objects on displays with visual verisimilitude to a viewer are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference now to FIG. 1, an exemplary system 100 that facilitates display of graphical objects to a viewer with visual verisimilitude is illustrated. The system 100 includes a display screen 102 that is configured to present image data to a viewer 104. The display screen 102 may be a portion of a television, a computer monitor, a display of a mobile computing device, such as a tablet (slate) computing device, phablet (e.g., combination phone/tablet), a mobile telephone, or the like. In another exemplary embodiment, the display screen 102 may be a relatively large display screen, such as can be found in museums, amusement parks, etc., and are likely to become readily available for use in home environments. Thus, for instance, the display screen 102 may be have a screen diagonal of at least 70 inches in length, but may be much larger (e.g., the screen diagonal may be tens of feet in length). As will be described in greater detail herein, in an exemplary embodiment, the display screen 102 can be a translucent display screen, such as a transparent organic light emitting diode (OLED) display.

The system 100 further includes at least one sensor 106 that is configured to output data that is indicative of a location of the eyes of the viewer 104 (e.g., in a three-dimensional coordinate system) relative to at least one reference point on the display screen 102. For example, a coordinate system can be established where, for instance, a bottom left corner of the display screen 102 is the origin of the coordinate system. The data output by the sensor 106 can be indicative of the location of the eyes of the viewer 104 relative to such origin. Further, the data output by the sensor 106 can be indicative of the direction of the gaze of the eyes of the viewer 104 (e.g., relative to reference planes). Thus, the data output by the sensor 106 can be indicative of the elevation angle and the azimuth angle of the direction of the gaze of the eyes of the viewer 104. While the system 100 is illustrated as including a single sensor (e.g., the sensor 106), it is to be understood that the sensor 106 can represent multiple sensors. For example, the sensor 106 can represent a red-green-blue (RGB) camera and an infrared (IR) camera, wherein data output by the RGB camera and data output by the IR camera can be utilized collectively to ascertain the location of the eyes of the viewer 104 as well as the direction of the gaze of the eyes of the viewer 104. In another exemplary embodiment, as will be described in greater detail herein, the sensor 106 can represent an array of cameras.

The system 100 further comprises a display system 108 that is configured to display graphical objects on the display screen 102 with visual verisimilitude (from the perspective of the viewer 104) based upon the location of the eyes of the viewer 104 and the direction of gaze of the eyes of the viewer 104. While the display system 108 is shown as being external to the display screen 102, it is to be understood that a single apparatus can comprise the display screen 102 and the display system 108 (as well as the sensor 106). For example, a television can comprise the display screen 102 and the display system 108. In another exemplary embodiment, the display system 108 may be included in a computing apparatus that is in communication with the display screen 102. For instance, the display system 108 can execute in a cloud computing device, and be in network communication with the display screen 102.

The display system 108 comprises a data store 110 that includes image data 112. The data store 110, for instance, may be included in a display buffer for the display screen 102. Pursuant to an example, the image data 112 can be programmatic in nature, in that the image data 112 includes virtual objects. Accordingly, the image data 112 can be presented to the viewer 104 as a portion of a video game or other suitable virtual environment where the viewer 104 desires to view the programmatic data. In another exemplary embodiment, the image data 112 can be image data received from multiple cameras (e.g., video data received from video cameras). In still another example, the image data 112 can be a broadcast video feed, a video stream received from a server, static images, etc. In the exemplary system 100, the image data 112 includes a representation of an object 114 (e.g., a three-dimensional object) that is desirably presented on the display screen 102 for viewing by the viewer 104. The representation of the object 114 will be referred to herein as the object 114, although it is to be understood that the viewer 104 is being presented with a view of an object, and not the object itself.

The display system 108 additionally includes a receiver component 116 that receives the data output by the sensor 106. A determiner component 118 is in communication with the receiver component 116, and computes the location of the eyes of the viewer 104 and the direction of the gaze of the eyes of the viewer 104 based at least in part upon the data output by the sensor 106 received by the receiver component 116. Exemplary techniques that can be employed by the determiner component 118 to compute the location of the eyes and the direction of the gaze of the viewer 104 are set forth below.

The display system 108 also includes an image processor component 120 that processes the image data 112 based upon the location of the eyes of the viewer 104 and the direction of the gaze of the viewer 104 computed by the determiner component 118. Processing performed by the image processor component 120 can include computing an orientation of the object 114 and a scale of the object 114 that causes the object 114 to be displayed with visual verisimilitude on the display screen 102 from the perspective of the viewer 104. That is, the object 114 is caused to be displayed on the display screen 102 to the viewer 104 as if the viewer 104 were looking at the object 114 through a pane of glass, rather than looking at the object 114 via the display screen 102. Accordingly, pursuant to an example, the object 114 may initially be presented near a center of the display screen 102, and the viewer 104 can likewise be positioned near the center of the display screen 102 and looking directly at the front of the object 114. The viewer 104 may then move to the right, while continuing to view the object 114. The determiner component 118, based upon the data output by the sensor 106, can determine the location of the viewer 104 and the direction of the gaze of the viewer 104, and the image processor component 120 can processes the image data 112 such that the object 114 is presented on the display screen 102 with visual verisimilitude (e.g., the viewer 104 will see a portion of the right side of the object 114, rather than only the front of the object 114).

In an exemplary embodiment, the image data 112 can include multiple images of the object 114 captured from cameras at respective multiple different locations, such that the images capture the object 114 at multiple perspectives. The image processor component 120 can receive such multiple images and select at least one image that corresponds to the location and the direction of gaze of the eyes of the viewer 104. Thus, the processing undertaken by the image processor component 120 can include the selection of the at least one image. Furthermore, the image processor component 120 can stitch together portions from multiple different images to cause the object 114 to be presented on the display screen 102 at an orientation and scale such that, from the perspective of the viewer 104, the object 114 is displayed with visual verisimilitude. A display component 122 is in communication with the image processor component 120 and causes the object 114 to be displayed in accordance with the processing undertaken by the image processor component 120.

The display system 108 may optionally include a recognizer component 124 that can recognize a gesture or voice command set forth by the viewer 104. The recognizer component 124 can then transmit such gesture to the image processor component 120, which can process image data to be displayed on the display screen 102 as a function of the recognized gesture/voice command. The display component 122 may then update image data shown on the display screen 102 based upon the output of the image processor component 120. Gestures that can be recognized by the recognizer component 124 may include a pinching gesture, a swiping gesture, a hand wave, or other suitable gesture that can be made by the viewer 104. Likewise, the recognizer component 124 can recognize spoken utterances set forth by the viewer 104 that are intended to cause the content on the display screen 102 to be updated. As mentioned above, operation of the display system 108 causes the display screen 102 to appear to the viewer 104 as being a window through which the viewer 104 views objects. The gesture/voice commands, then, can be employed by the viewer 104 to, from the perspective of the viewer 104, change the position/tilt of the window. Thus, if the viewer 104 sets forth a swipe from the left to the right, the recognizer component 124 can recognize such swipe as a gesture, and change the content displayed on the display screen 102 as if the viewer 104 had moved the window from the left to the right or the right to the left. In another example, the viewer 104 can set forth a gesture that indicates a desire of the viewer 104 to rotate the window about an axis. The recognizer component 124 can recognize the gesture, and the image processor component 120 can perform processing on the image data 112 based upon such gesture (e.g., which causes the display component 122 to update presentation of the object 114 on the display in accordance with the gesture). Still further, the viewer 104 can, from the perspective of the viewer 104, cause the window to be moved closer or further away from the object 114 by way of gestures.

The display system 108 may further optionally include an augmenter component 126 that can augment content displayed on the display screen 102 with metadata or additional content. For example, the object 114 presented on the display screen 102 may be an item that is purchasable by the viewer 104. The augmenter component 126 can augment the image data 112 with additional information about such object 114, such as user reviews, price, identity of a brick and mortar store where the object 114 can be purchased, etc. For instance, the augmenter component 126 can set forth such additional information responsive to the viewer 104 selecting the object 114 (e.g., through a voice command, interaction with the display screen 102 which may be touch sensitive, etc.).

Additionally, it is to be understood that the augmenter component 126 can receive data that is displayed on the display screen 102 from a source other than the image data 112. For instance, the augmenter component 126 may have access to a search engine and can present information about the object 114 provided by the search engine in graphical relation to such object 114 on the display screen 102. In still another example, the image data 112 may have audio data corresponding thereto, wherein the audio data includes words in a language not spoken by the viewer 104. The augmenter component 126 can be in communication with a translation engine, and can cause a translation of such audio to be displayed on the display screen 102 together with the graphical object 114. In still yet another example, the object 114 may be a person (e.g., with whom the viewer 104 is communicating). The augmenter component 126, utilizing facial feature extraction and recognition technologies, can identify the person and provide additional data about the person on the display screen 102. This additional data can include a name of the person, biographical data about the person, recent communications between the viewer 104 and the person, data upon which the viewer 104 and the person are collaborating, etc. It can be ascertained that various types of data can be presented on the display screen 102 by the augmenter component 126.

In yet another example, the location and direction of gaze of the eyes of the viewer 104 can be employed to identify an object on the display screen 102 that is currently being viewed by the viewer 104 (e.g., from amongst several possible objects). For instance, it can be determined that the viewer 104 is currently gazing at a particular object on the display screen 102; based upon such determination, static images of the object can be generated and retained for subsequent viewing by the viewer 104. In another example, the object being viewed can be subjected to a zooming function, such that the viewer 104 can cause the object to be enlarged (or reduced) in size. Additionally, the augmenter component 126 can cause other data to be presented together with the object, such as, but not limited to, options for purchasing the object, reviews about an object, a URL of a web page pertaining to the object, etc. If the object is a person, the augmenter component 126 can provide information about such person, including the name of the person, information pertaining to how to contact the person, etc.

The display system 108 may further optionally include a transmitter component 128 that can transmit at least a portion of the data output by the sensor 106 to another display system, for instance, to facilitate a telepresence application. Accordingly, the sensor 106 may be a RGB camera that captures images of the viewer 104, and the transmitter component 128 can transmit such images to another display system that is similar to the display system 108. In another example, the sensor 106 can include a microphone, and the transmitter component 128 can cause audio data captured by the microphone to be transmitted to another computing device. In an example, the transmitter component 128 can transmit data (e.g., images) to another computing device of another viewer to facilitate creation of a portal between the viewer 104 and the another viewer.

Additional detail pertaining to exemplary techniques that may be used by the determiner component 118 to determine the location and direction of gaze of the eyes of the viewer 104 are now set forth. As noted above, the sensor 106 can represent a RGB camera and an IR camera (e.g., used for depth sensing). The determiner component 118 can be configured with facial recognition processing functionality that, for example, can detect features of the face of the viewer 104. Such features can include centers of the eyes, center of the nose, corners of the mouth, etc. of the viewer 104. The determiner component 118 can then align the features of the face detected in the RGB images with corresponding depth images, thus mapping depth data to pixels of the RGB image. Accordingly, if the location of the sensor 106 is known relative to a reference location of the display screen 102, the determiner component 118 can determine the location of the eyes of the viewer 104 in a three-dimensional coordinate system based upon the locations of the eyes in the RGB image and corresponding depth data mapped thereto.

The determiner component 118 can also analyze the data output by the sensor 106 to ascertain a tilt of the head of the viewer 104. Based upon the tilt of the head of the viewer 104 and the determined location of the eyes of the viewer 104, the direction of gaze of the eyes of the viewer 104 can be inferred. In another exemplary embodiment, as mentioned above, the determiner component 118 can be configured with facial feature recognition technologies, such that the location of the nose, eyes and corners of the mouth of the viewer 104 can be ascertained. The determiner component 118 can determine the direction of gaze of the eyes of the viewer 104 based upon determined locations of the eyes and nose of the viewer 104 in a three-dimensional coordinate system. In still yet another example, the determiner component 118 can be configured to identify a direction in which the nose of the viewer 104 is pointing, and can infer that the gaze of the eyes of the viewer 104 is parallel to the direction that the nose is pointing. In yet another exemplary embodiment, the determiner component 118 can be configured to detect the locations of the pupil and iris relative to the sclera in each eye in an RGB image, map depth data to the locations of the pupil and iris, and infer the direction of the gaze of the viewer 104 based upon the above-mentioned data. Using such approach, the determiner component 118 can detect situations where the face of the viewer 104 is oriented towards a first direction while the gaze of the eyes of the viewer 104 is in a different direction.

Additional detail pertaining to exemplary processing that can be undertaken by the image processor component 120 is now provided. As mentioned above, the image data 112 can include programmatic objects, such that the object 114 is virtual in nature (e.g., the object 114 in the image data is a three-dimensional computer-implemented model). The image processor component 120, based upon the determined location and direction of gaze of the eyes of the viewer 104, may scale the object 114 and orient the object 114 for display on the display screen 102, taking into consideration parallax, barrel distortion, pincushion distortion, and the like, such that when caused to be displayed on the display screen 102 by the display component 122, the object 114 is shown with visual verisimilitude. In connection with performing such processing, the image processor component 120 can perform ray tracing based upon the factors including the location and direction of gaze of the eyes of the viewer 104, the location of the object 114, etc.

Additionally, the image data 112 may include multiple frames of video received from multiple respective cameras that are positioned to capture video of the object 114 from different perspectives. Such frames can be synchronized, such that for any given instance in time, multiple frames of video from multiple cameras correspond to such instance in time. The image processor component 120 can identify which frames correspond to the location and direction of gaze of the eyes of the viewer 104, and can perform image stitching such that the object 114 is displayed with visual verisimilitude. Thus, the viewer 104 can be presented with video data that is processed in real-time, facilitating natural interaction with the object 114. Similarly, the image data 112 may include several static images of a scene (captured at different perspectives), and the images can be processed by the image processor component 120 to cause the scene to be displayed to the viewer with visual verisimilitude regardless of the location and direction of gaze of the eyes of the viewer 104. In another example, the image data 112 can include recorded video of the object 114 (e.g., captured from multiple cameras) that can be played back to the viewer 104 upon request, wherein two different viewings of the video may be displayed differently to the viewer 104 (e.g., a first time the viewer 104 views the video, the viewer 104 stands at a leftward side of the display screen 102, while a second time the viewer 104 views the video, the viewer 104 stands at a rightward side of the display screen 102).

Figure 2:
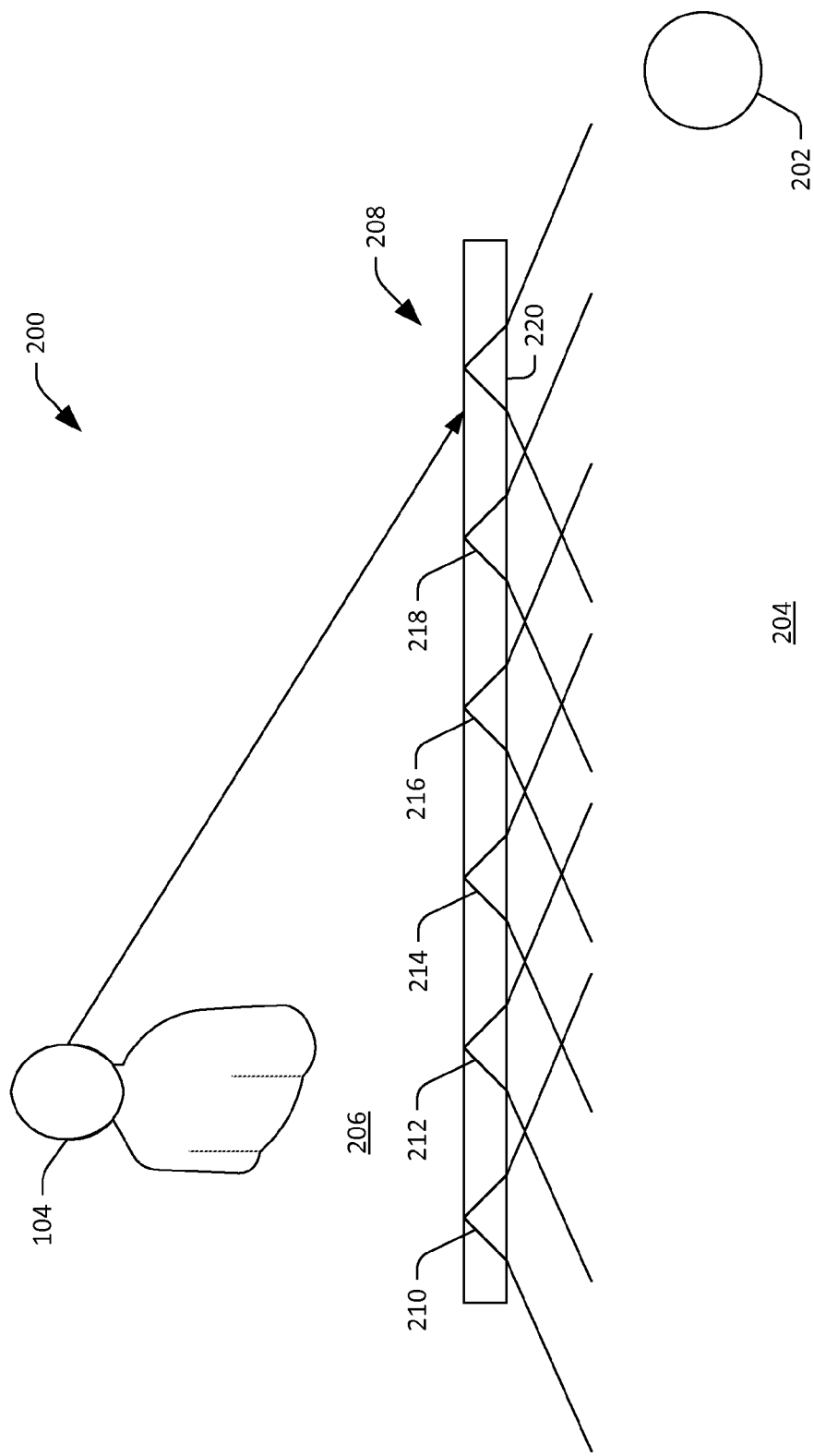
FIG. 2 illustrates an array of cameras being employed to capture images of an object from different perspectives.

Now referring to FIG. 2, an exemplary system 200 that facilitates presenting an object 202 on the display screen 102 with visual verisimilitude is illustrated. The object 202 is at a first location 204, which is remote from a second location 206 of the viewer 104. For purposes of explanation, the first location 204 and the second location 206 can be perceived as being separated by a window/pane of glass. Accordingly, as the location and direction of gaze of the eyes of the viewer 104 change in the second location 206, the orientation of the object 202 from the perspective of the viewer 104.

In the example shown in FIG. 2, an array 208 of wide-angle field of view (FOV) cameras comprises a plurality of wide-angle FOV cameras 210-220. The cameras 210-220 have overlapping fields of view, such that the object 202 can be captured from different view angles/perspectives. Thus, for instance, images captured by the cameras 218 and 220 may include at least a portion of the object 202, while images captured by cameras 210-216 may not include the object 202. Therefore, when location and direction of gaze of the eyes of the viewer 104 are as shown in FIG. 2, the image processor component 120 can identify that images captured by the cameras 216 and 218 are to be employed to cause the display screen 102 to display the object 202 with visual verisimilitude from the perspective of the viewer 104 (e.g., as if the viewer 104 is viewing the object 202 through a pane of glass).

Figure 3:
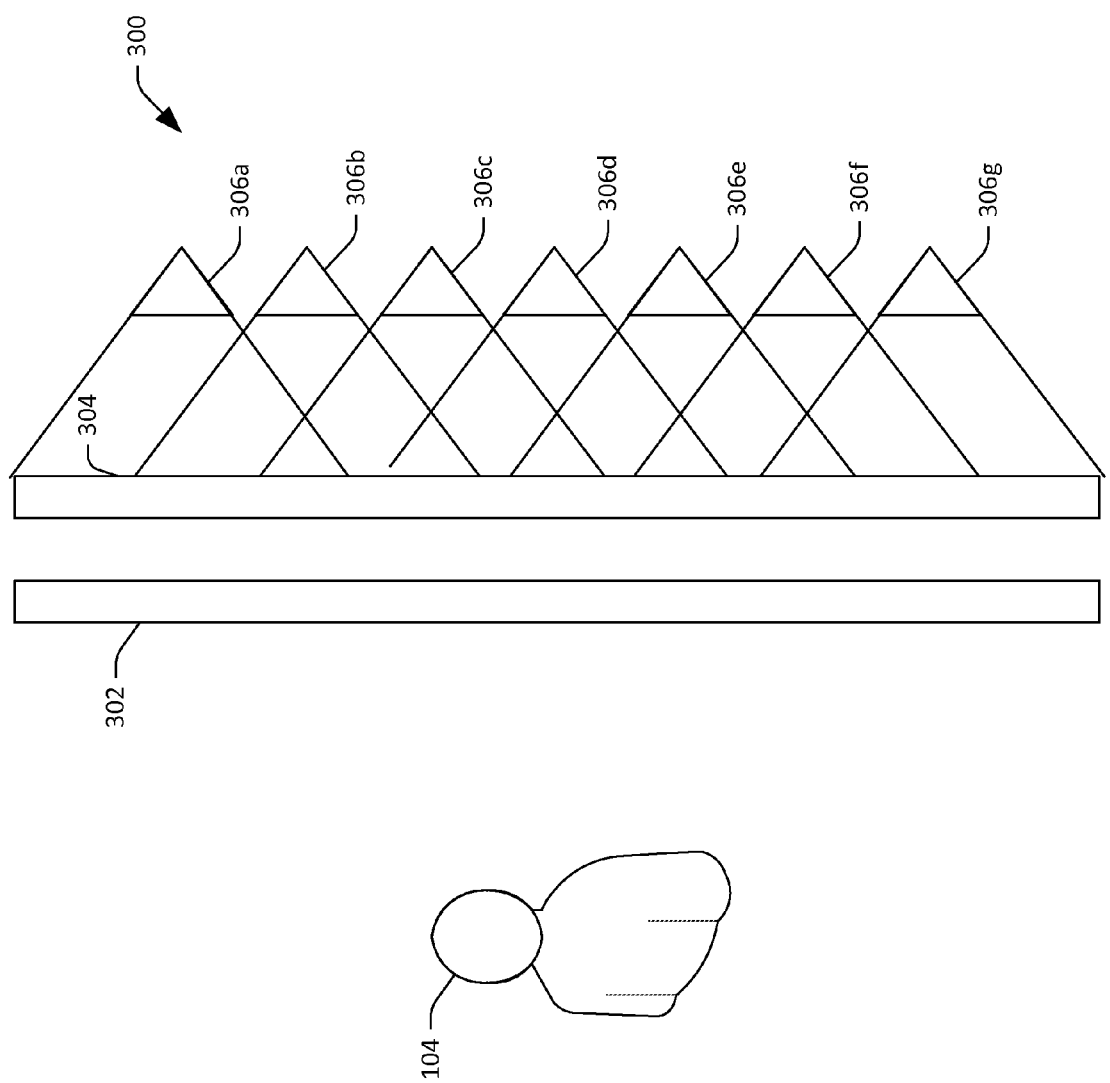
FIG. 3 illustrates an exemplary display that can facilitate a telepresence application.

With reference now to FIG. 3, an exemplary display device 300 that facilitates determining a location and direction of gaze of eyes of the viewer 104 is illustrated. The display device 300 includes a transparent OLED display 302, which can be employed to present imagery to the viewer 104. The display device 300 may optionally include a one-way mirror 304 positioned adjacent to the OLED display 302, such that the viewer 104 is not able to view hardware behind the one-way mirror 304. Accordingly, the viewer 104 perceives portions of the display device 300 not displaying graphical content as a mirror. Further, when the OLED display 302 is not displaying content (it is transparent), the default view can be that of a mirror.

The display device 300 also includes a plurality of wide-angle FOV cameras 306a-306g that are embedded within the display device 300. Additionally or alternatively, IR cameras or other depth sensors can also be embedded in the display device 300. As shown, fields of view of the cameras 306a-306g can partially overlap, such that stereoscopic analysis of images captured by such cameras 306a-306g can be employed by the determiner component 118 to determine the location and direction of gaze of the eyes of the viewer 104. To facilitate a telepresence application, images output by the cameras 306a-306g can be transmitted to a computing device of another viewer.

While the cameras 306a-306g are shown as being embedded in the display device 300 and located (from the perspective of the viewer 104) behind the OLED display 302, it is to be understood that in other embodiments, the OLED display 302 can be replaced with a convention display (e.g., LED, LCD, plasma), and the cameras 306a-306g can be positioned to surround such display.

Figure 4:
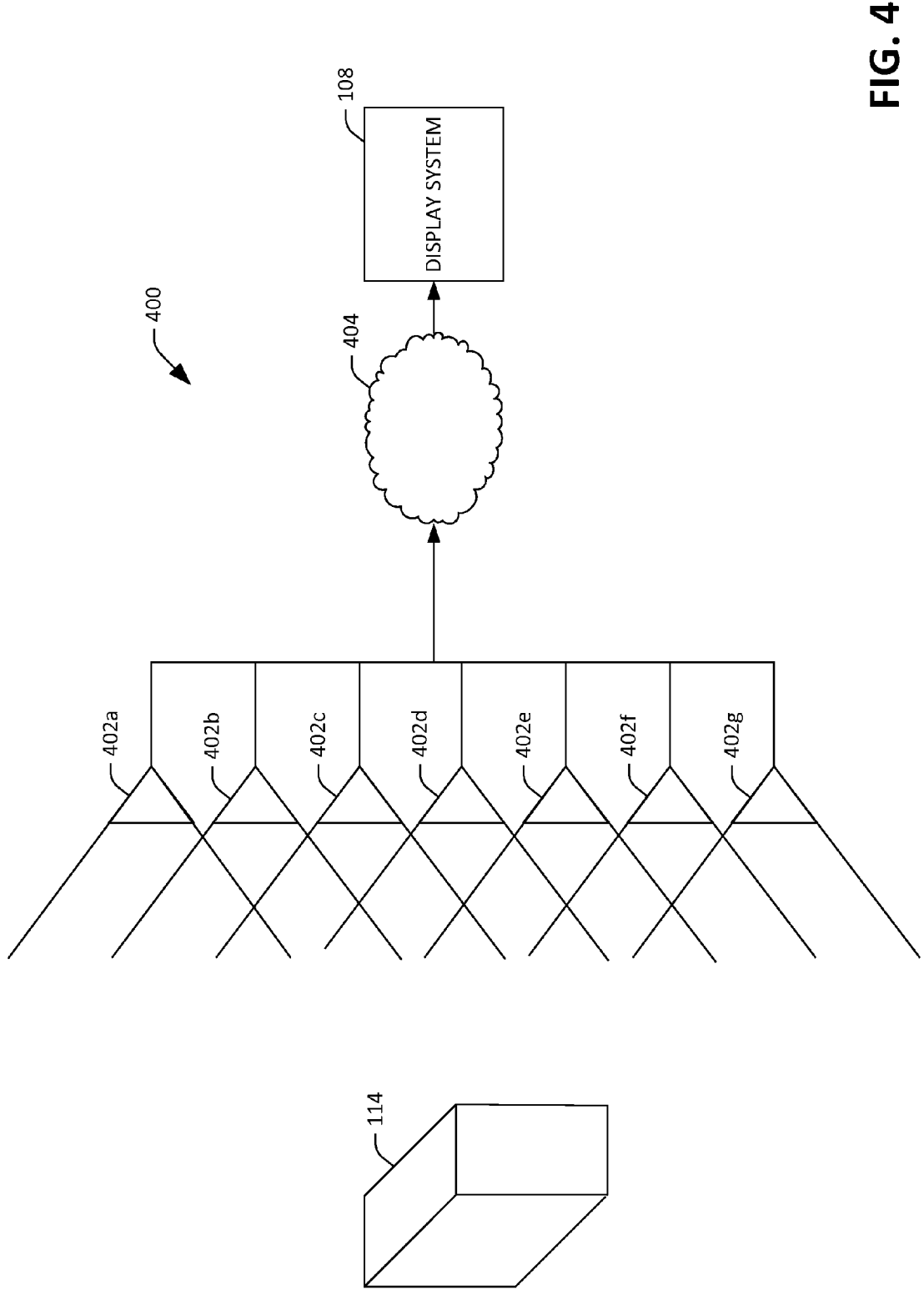
FIG. 4 illustrates a plurality of cameras capturing an image of an object that, wherein a representation of the object is to be displayed with visual verisimilitude on a display screen to a viewer.

With reference now to FIG. 4, an exemplary system 400 that facilitates provision of video frames (images) to the display system 108 is illustrated. The system 400 includes a plurality of wide angle FOV cameras 402a-402g that are positioned to capture images of the object 114. Fields of view of the cameras 402a-402g can overlap, such that the object 114 can be captured from different perspectives by the cameras 402a-402g. Images captured by the cameras 402a-402g are transmitted by way of a network 404 to the display system 108, where the object 114 is displayed on the display screen 102 with visual verisimilitude. As indicated above, the display system 108 can be internal to a display device, such that it executes as a portion of client-side software. In another example, the display system 108 can be executed in a cloud computing environment, and provided as a service to the viewer 104.

In an exemplary application, a retail establishment/grocery can be virtualized through employment of the system 400. For example, a retailer can position items for sale in desired arrangement, and the cameras 402a-402g can be positioned to capture such items at various different perspectives. From the perspective of the viewer 104 viewing the display screen 102, the items are shown on the display screen 102 with visual verisimilitude, in real-life size and oriented in accordance with location and direction of gaze of the eyes of the viewer 104. The viewer 104, then, is provided with a natural shopping experience, potentially without having to leave her home. For instance, the viewer 104 can cause the position of the "window" to change, as if the viewer 104 is walking down an aisle of a store. In an exemplary embodiment, the display screen 102 can be a touch-sensitive display, and the viewer 104 can select the object 114 by touching the display screen 102 at a location of the object 114. Responsive to the selection of the object 114 being detected, the augmenter component 126 can cause an option to purchase the object 114 to be presented on the display screen 102, additional information about the object 114 to be presented on the display screen 102, etc., to be presented by the augmenter component 126. It is also to be understood that the cameras 402a-402g need not be video cameras that continuously images. Rather, the cameras 402a-402g can capture a set of synchronized images (e.g., one image from each camera), and such images can be retained in the data repository 110.

While shopping has been set forth as one exemplary application for which the display system 108 may be particularly well-suited, it is to be understood that various other applications are contemplated. For example, the display system 108 can be used in connection with presenting a virtual vacation to the viewer 104. In an example, the viewer 104 can indicate a desire to explore the Amazon, and the object 114 can be a wild animal in the Amazon shown with visual verisimilitude to the viewer 114. To further represent such an environment, the display system 108 can be configured to provide other types of feedback, such as, modifying a temperature in a room, causing lights to be brightened or dimmed, simulating gusting of wind, olfactory feedback, etc.

Figure 5:
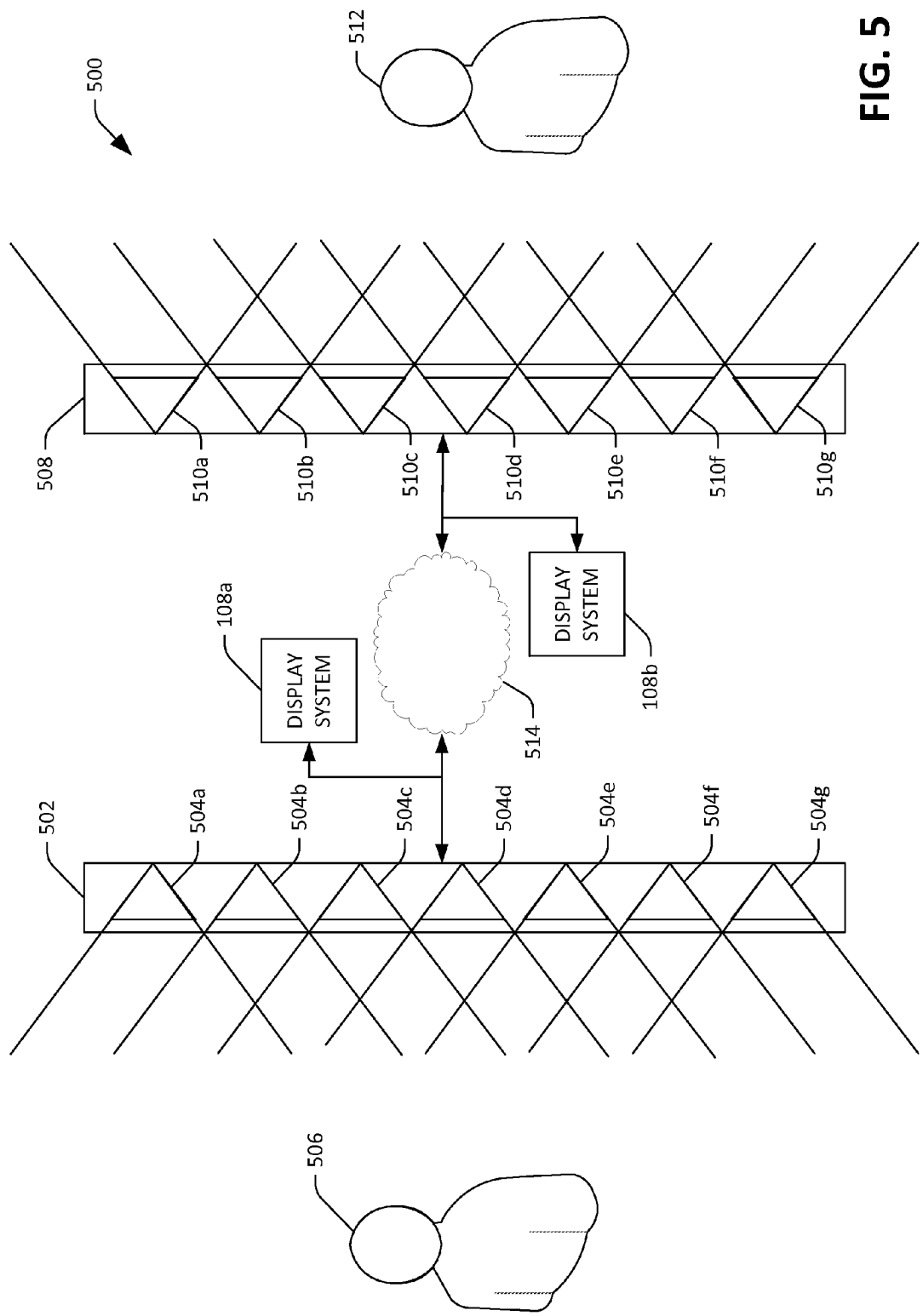
FIG. 5 illustrates an exemplary system that facilitates a telepresence application, where a first person and a second person are communicating with one another by way the telepresence application, and wherein the first person and the second person are presented with representation of the other person with visual verisimilitude.

Now referring to FIG. 5, an exemplary system 500 that can be used in connection with a telepresence application is illustrated. The system 500 comprises a first display device 502 that includes a first plurality of embedded cameras 504a-504g, wherein the first plurality of embedded cameras 504a-504g are configured to capture images of a first person 506 that is viewing content displayed on the first display device 502. The system 500 also comprises a second display device 508 having a second plurality of cameras 510a-510g embedded therein. The first plurality of cameras 510a-510g are configured to capture respective images of a second person 512 that is viewing content displayed on the second display device 508. The first display device 502 is in communication with a first instance of the display system 108a. The first instance of the display system 108a receives images captured by the first plurality of cameras 504a-504g and computes a location and direction gaze of the eyes of the first person 506. The display system 108a additionally receives, by way of a network 514, images output by the second plurality of cameras 510a-510g embedded in the second display device 508, and causes the second person 512 to be displayed on the first display device 502 based upon such images and the location and direction of gaze of the eyes of the first person 506, as described above.

Similarly, a second instance of the display system 108b is in communication with the second display device 508, and receives the images output by the second plurality of cameras 510a-510g. The second instance of the display system 108b computes the location and direction of gaze of the eyes of the second person 512 based upon the images output by the second plurality of cameras 510a-510g. Further, the second instance of the display system 108b receives images output by the first plurality of cameras 504a-504g by way of the network 514. The second instance of the display system 108b causes the second display device 508 to present images of the first person 506 thereon with visual verisimilitude from the perspective of the second person 512. Thus, even though the first person 506 and the second person 512 may be separated by a relatively large geographic distance, from the perspective of the first person 506 and the second person 512, they are communicating with one another through a pane of glass.

Moreover, while not shown, at least one of the first display device 502 or the second display device 508 can include a microphone and directional speakers. The first instance of the display system 108a or the second instance of the display system 108b can be configured to operate the directional speakers to simulate utterances output by at least one of the first person 506 or the second person 512 from their appropriate locations. In an example, the first person 506 may have her head turned slightly to the left when speaking with the second person 512. The microphone can capture such speech and the display system 108a can determine that the head of the first person 506 is tilted slightly to the left. The second instance of the display system 108b may then operate a directional speaker associated with the second display device 508, thereby causing the speech captured by the microphone of the first display device 502 to be transmitted in a direction that corresponds with the detected tilt of the head of the first person 506.

While the system 500 shows separate instances of the display system 108a and 108b being used by the first display device 502 and the second display device 508, it is to be understood that a single instance of the display system 108 can execute in the cloud and handle the processing described above. Alternatively, the first instance of the display system 108a may be included in the first display device 502 while the second instance of the display system 108b may be included in the second display device 508 (e.g., at least one of the display systems 108a or 108b may be included in a client). Additionally, while the display devices 502 and 508 are illustrated as each comprising respective multiple cameras, it is to be understood that, in other embodiments, the first display device 502 may include multiple cameras while the second display device 508 may include a single camera (e.g., the second display device 508 may be a portable computing device). In such an embodiment, the second display device 508 can display images of the first person 506 with visual verisimilitude to the second person 512, while the first display device 502 can display a static video feed that includes the second person 512.

Figure 6:
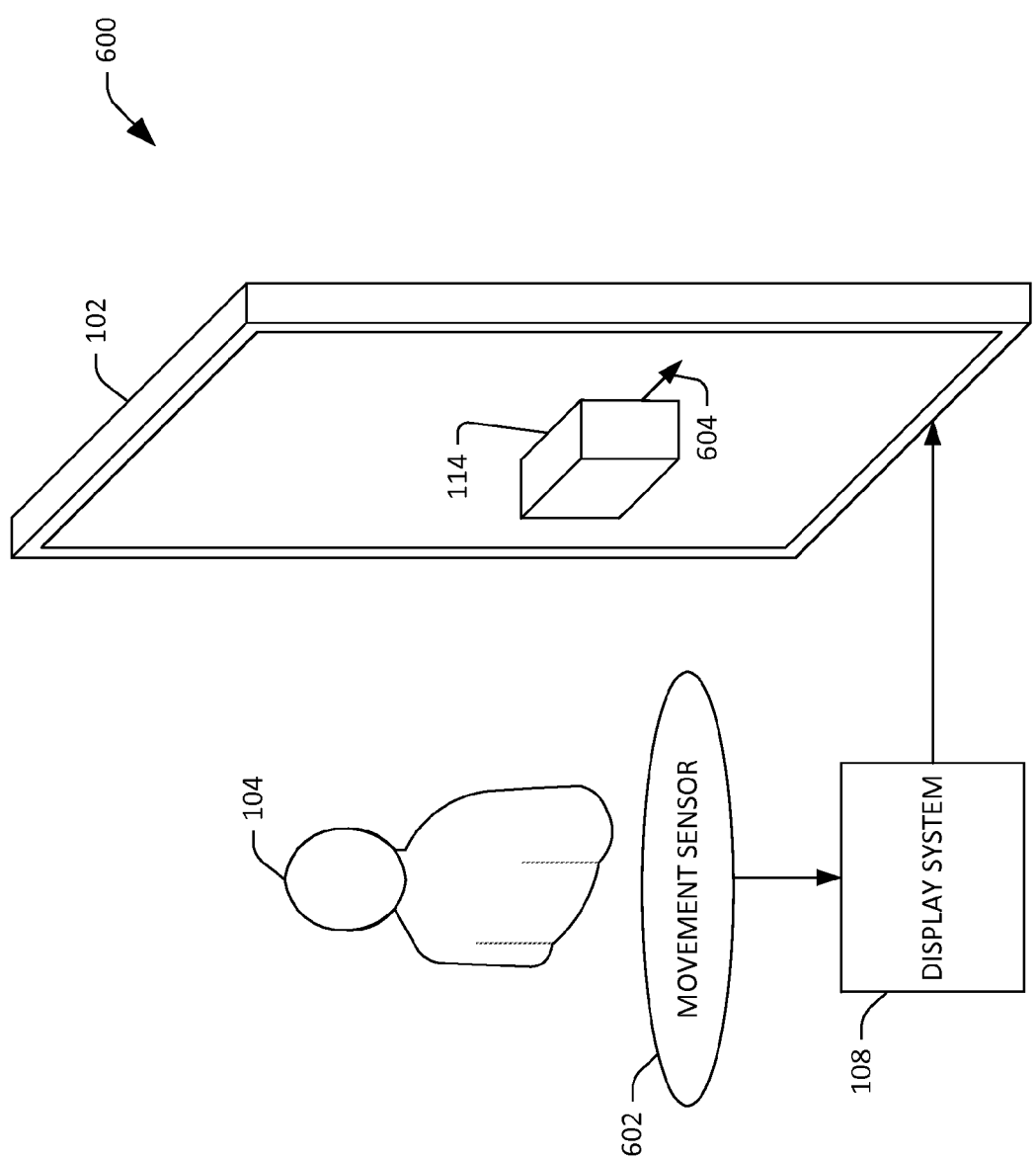
FIG. 6 illustrates an exemplary system where a represented object shown on a display is altered as a function of detected movement of a viewer.

Now referring to FIG. 6, another exemplary system 600 that facilitates presentation of objects with visual verisimilitude to the viewer 104 is illustrated. The system 600 includes a movement sensor 602 that can sense movement of the viewer 104. In an exemplary embodiment, the movement sensor 602 may be a bidirectional or omnidirectional treadmill, such that the viewer 104 can walk on such treadmill. The display system 108 can receive data output by the movement sensor 602, and can cause content displayed on the display screen 102 to be updated based upon the data output by the movement sensor 602. This can effectively cause the display screen 102 to act as a sliding window that moves in the direction of motion of the viewer 104. The viewer 104 can thus be provided with the experience of walking aisles of a grocery store, walking hallways of a school building, etc. Additionally, as described above, the display system 108 determines the location and direction of gaze of the eyes of the viewer 104, such that objects shown on the display screen 102 are presented with visual verisimilitude to the viewer 104. In an example, the object 114 can be presented on the display screen 102. The movement sensor 602 can be a treadmill and the viewer 104 can walk to the left relative to the display screen 102 on such treadmill. The display system 108 thus causes the object 114 to move to the right on the display screen 102, as shown by the arrow 604. The object 114 is displayed with visual verisimilitude to the viewer 104, such that the perspective/scale of the object 114 changes on the display screen 102 as the viewer 104 continues to walk to the left on the treadmill.

Figure 7:
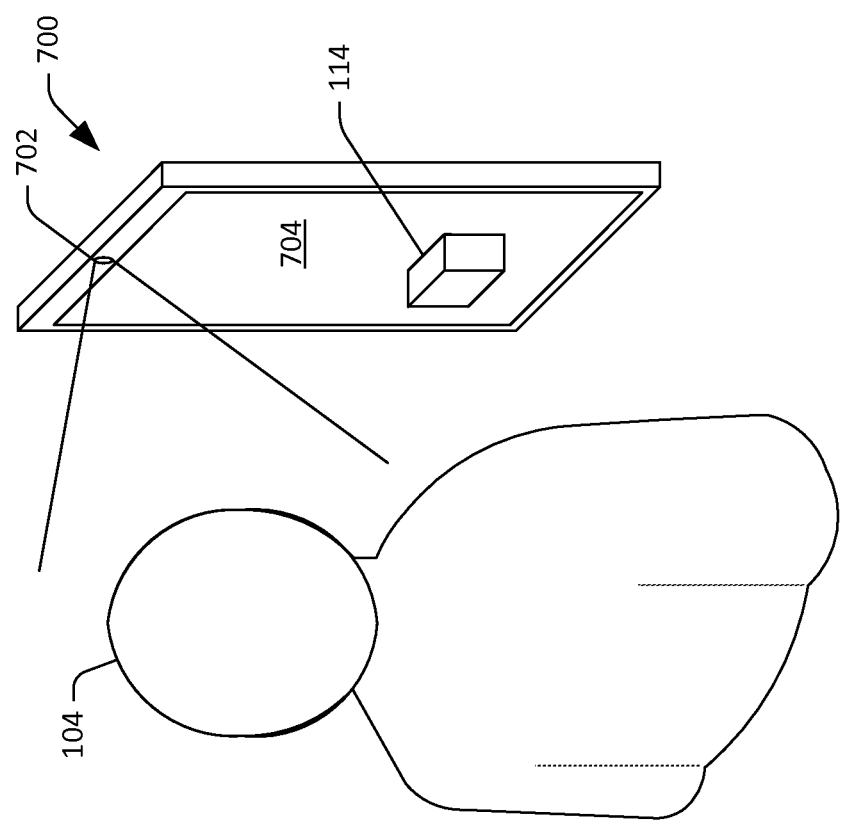
FIG. 7 illustrates an exemplary mobile computing device that is configured to display a represented object on a display screen thereof with visual verisimilitude to a viewer of such display screen.

Turning now to FIG. 7, an exemplary mobile computing device 700 that includes or is in communication with the display system 108 is illustrated. The mobile computing device 700 may be a tablet (slate) computing device, a mobile telephone, a phablet, a laptop, or some other computing device, wherein the display screen is relatively small. The computing device 700 includes at least one camera 702 in the bezel of the computing device 700. Accordingly, the camera 702 is not embedded behind a screen 704 of the computing device 700. In other embodiments, however, the camera 702 may be embedded behind the screen 704, wherein the screen 704 is transparent in nature (e.g., a transparent OLED display screen). The camera 702 is configured to capture images of the viewer 104 that are indicative of location and direction of gaze of the eyes of the viewer 104. The display system 108 can display the object 114 on the display screen 704 with visual verisimilitude to the viewer 104 based upon the determined location of the eyes and direction of gaze of the viewer 104.

It is to be understood that additional technologies can be used in combination with the display of graphical objects with visual verisimilitude. For instance, in a telepresence application, face recognition technologies can be employed to detect an identity of a first person participating in a telepresence session, such that the display of the first person to a second person in the telepresence session is augmented with a name of the first person, e-mails recently communicated between the second person and the first person, as well as other information about such first person. Augmented information, shown in connection with any suitable object, can include touchable menus, dialog boxes, hover tags, etc., which can be placed in graphical relation to an object displayed on a display screen. Furthermore, as mentioned above, automated translation technologies can be employed, such that spoken words output by a first person in a first language can be presented to a second person in a native language of such second person.

The technologies described herein can also be employed in connection with creating an augmented reality for a person viewing a display screen. For instance, life-size avatars can be presented to the viewer 104 with visual verisimilitude. The viewer 104 may interact with the life-size avatar in a manner that is natural to the viewer 104. Such avatar, for example, may be a virtual assistant for a particular application that the viewer is employing via the display screen 102.

In an embodiment that may be particularly well-suited for shopping for clothes, wide-angle FOV cameras can be embedded in a display screen, as shown in FIG. 3, where a one-way mirror is positioned adjacent to the transparent OLED screen. For example, augmented reality scenarios are envisioned, such as the display screen 102 presenting life-size articles of clothing that can be "tried on" by the viewer 104 (e.g., an article of clothing is shown on the display screen 102, and the remainder of the screen acts as a mirror). Thus, the viewer 104 can virtually try on clothes and be provided with immediate feedback as to the style/fit of the clothing on the viewer 104. Similar scenarios are contemplated with respect to hairstyles, accessories, etc.

In other embodiments, the technologies described herein can be employed in connection with virtual or remote education scenarios. In such scenarios, students can remotely participate in a classroom environment, where a teacher is shown on respective display screens of the students with visual verisimilitude to each student. Therefore, from the perspective of the student, the student can feel as if she is sitting in the same class with the teacher—but separated by a pane of glass. In yet another application, remote healthcare can be facilitated, such that a healthcare provider can communicate with a patient as if they were separated only by a pane of glass.

Further, while the systems set forth above have been described with respect to a single user viewing the display screen 102, it is contemplated that the display screen 102 may be configured to output different visuals to different viewers, depending upon their locations relative to the display screen 102. That is, a first viewer of the display screen 102 will be presented with a first visual, while a second viewer of the display screen will be presented with a second visual, so long as the first viewer and the second viewer are sufficiently far apart. In such a scenario, a first viewer can be provided with a first visualization (which includes an object presented with visual verisimilitude to the first viewer) while a second viewer can be provided with a second visualization (which can include the object presented with visual verisimilitude to the second viewer).

It still yet another embodiment, video captured by multiple cameras can be retained and played back at a later time, where the orientation of what is shown at the later time is dependent upon a currently detected location and direction of gaze of the eyes of the viewer 104. Similarly, recorded video can be transmitted to another computing device, where it can be watched at a later time. Furthermore, the technologies described herein may be particularly well-suited for remote inspection of machinery, remote viewing of statues, and so forth, as objects presented are shown with visual verisimilitude.

Figure 8:
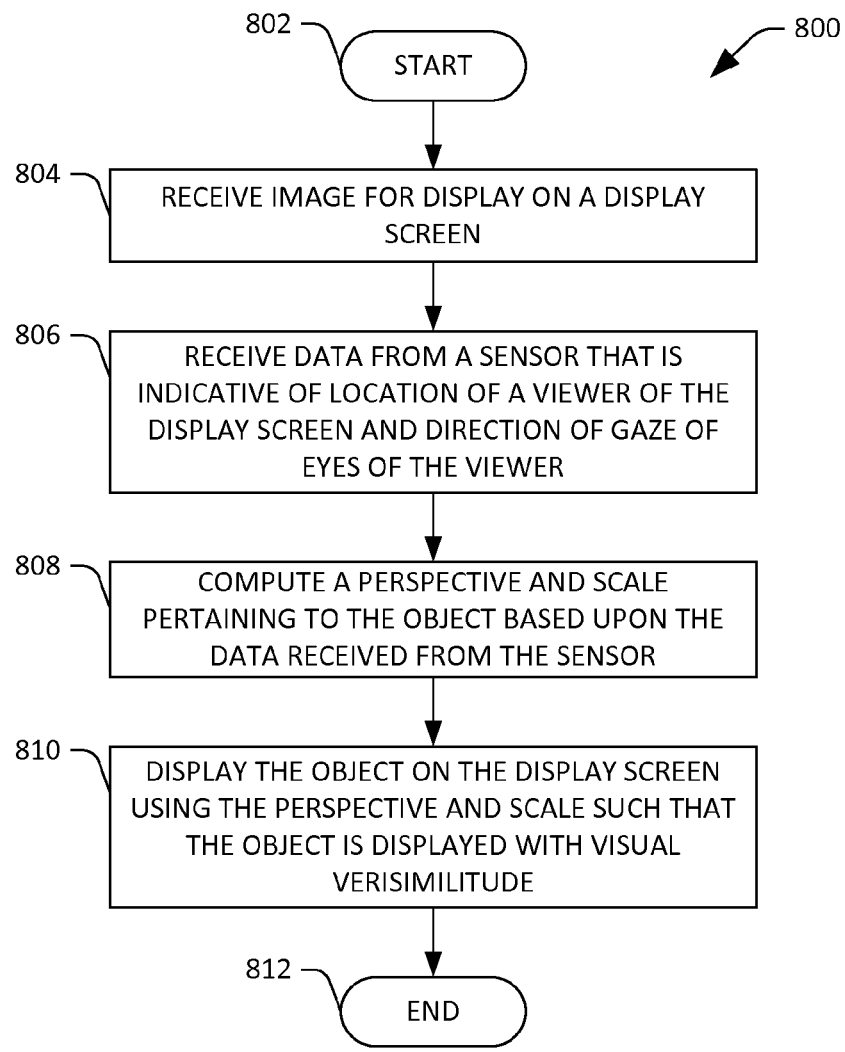
FIG. 8 is a flow diagram that illustrates an exemplary methodology for displaying a representation of an object on a display screen with a perspective and scale that causes the object to be displayed with visual verisimilitude to a viewer.

Turning now to FIG. 8, an exemplary methodology 800 that facilitates displaying an object on a display screen such that the object is displayed with visual verisimilitude to a viewer is illustrated. The methodology 800 starts at 802, and at 804 image data for display on a display screen is received. As indicated above, such image data can be virtual image data or can be overlapping images of a scene. At 806, data is received from at least one sensor that is indicative of a location of eyes of a viewer relative to a reference point on the display screen and a direction of gaze of the eyes of the viewer. For instance, the at least one sensor can include a plurality of cameras, such that stereoscopic analysis can be undertaken over images captured by such cameras to ascertain the location and direction of gaze of the eyes of the viewer. In other embodiments, an IR camera or other depth sensor can be used in connection with ascertaining a location and direction of gaze of the eyes of a viewer.

At 808, the image data is processed based upon the data received from the at least one sensor. The processing of the image data includes computing a perspective and scale of an object included in the image data as such object is to be displayed on the display screen. Such perspective and scale is based upon the data received from the sensor at 806.

At 810, the object is displayed on the display screen using the perspective and scale computed at 808, such that from the perspective of the viewer, the object is displayed with visual verisimilitude (e.g., a 1:1 correspondence in scale and orientation). The methodology 800 completes at 812.

Figure 9:
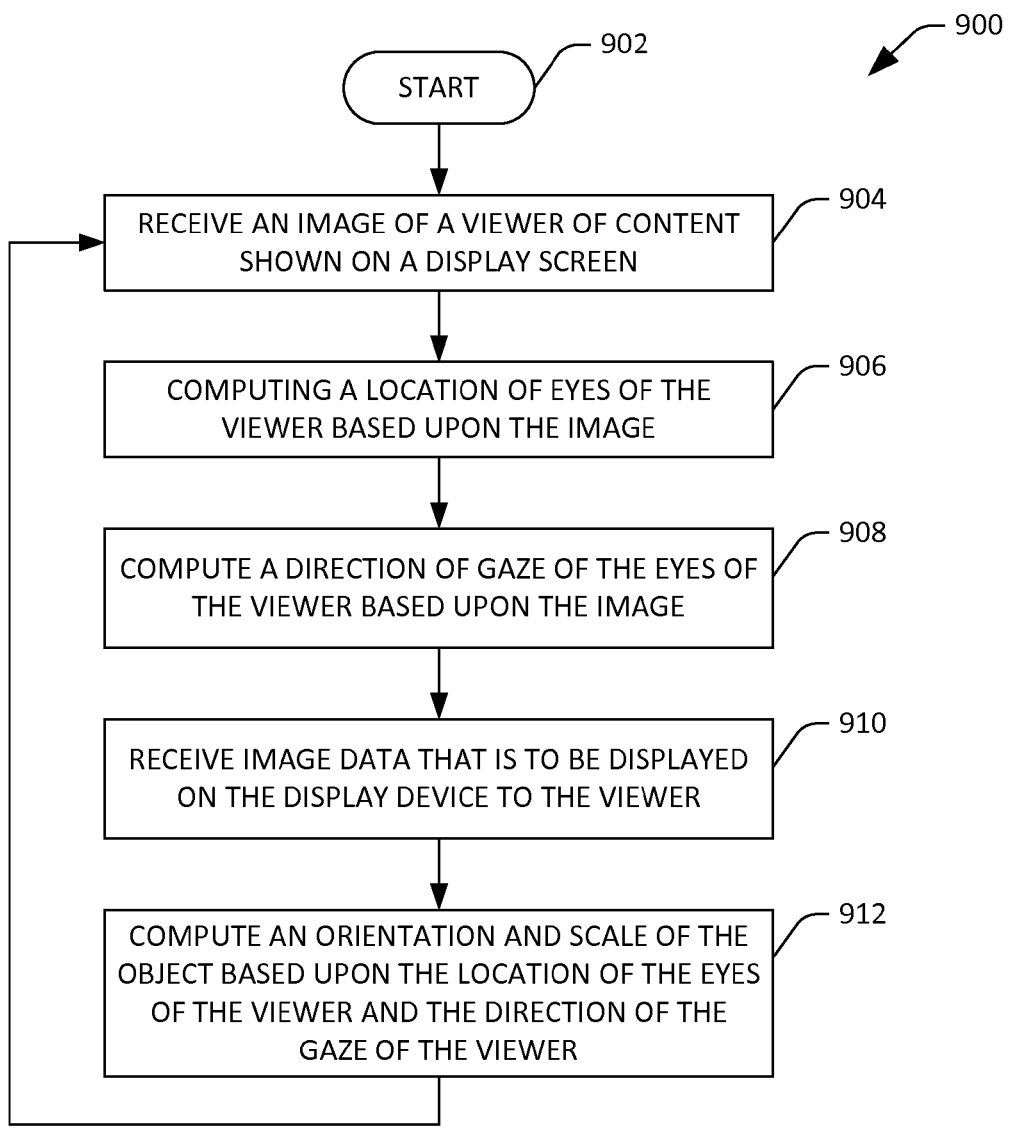
FIG. 9 is a flow diagram that illustrates an exemplary methodology for computing an orientation and scale of a representation of an object, such that the representation of the object is presented on a display screen with visual verisimilitude to a viewer.

With reference now to FIG. 9, an exemplary methodology 900 that facilitates computing an orientation and scale of an object shown in a video feed is illustrated. The methodology 900 starts at 902, and at 904 an image of a viewer of content being shown on a display screen is received. Such image can be captured by at least one camera embedded in the display device, such that the display screen is between the viewer and the camera. In another example, the image can be received from a camera that is exterior to display screen. At 906, the location of the eyes of the viewer are computed based upon the image received at 904.

At 908, a direction of gaze of the eyes of the viewer is computed based upon the image received at 904. At 910, image data is received that is to be displayed to the viewer on a display device, such as an OLED display. The image data includes, for example, a representation of an object.

At 912, responsive to computing the location of the eyes of the viewer and the direction of the gaze of the viewer, an orientation and scale of the representation of the object computed based upon the location and direction of the gaze of the viewer, computed at 906 and 908, respectively. The orientation of the object and the scale of the object are computed such that when the object is displayed on the display device with such orientation and scale, and when the eyes of the viewer are at the computed location and the gaze of the viewer is in the computed direction, the object is displayed with visual verisimilitude to the viewer. The methodology 900 then returns to 904, such that a change in location of the eyes of the viewer and/or change in the direction of the gaze of the viewer can be detected and image data can be presented on the display screen accordingly.

Figure 10:
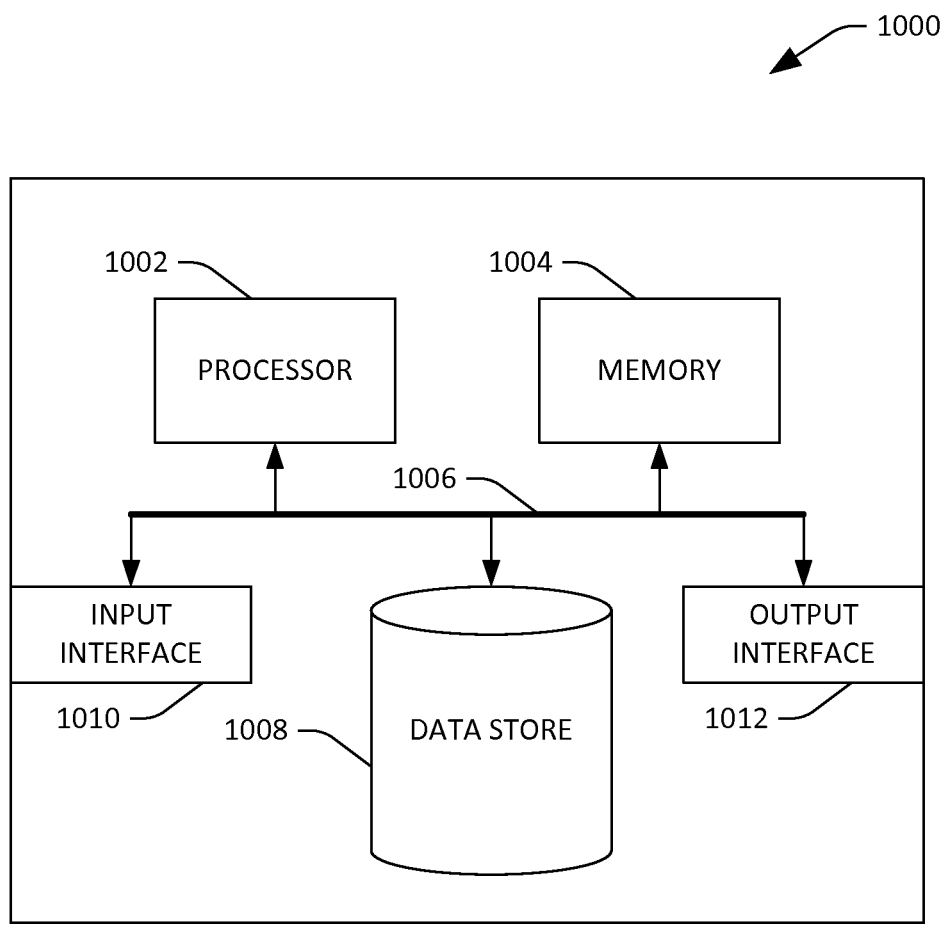
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that presents a graphical object with visual verisimilitude to a viewer. By way of another example, the computing device 1000 can be used in a system that supports determining a location and direction of gaze of eyes of the viewer. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store image data, a programmatic object, etc.

The computing device 1000 additionally includes a data store 1008 that is accessible by the processor 1002 by way of the system bus 1006. The data store 1008 may include executable instructions, video data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method performed by a processor of a computing device, the method comprising:
   receiving image data for display on a display, the image data comprising a plurality of views of a scene, the scene comprises an object;
   receiving data from at least one sensor, the data being indicative of:
      location of eyes of a viewer relative to the display; and
      direction of gaze of the eyes of the viewer;
   processing the image data based upon the data received from the at least one sensor, wherein processing the image data comprises:
      computing a perspective and scale of the object for display on the display, the perspective and scale based upon the data received from the at least one sensor; and generating a representation of the object based upon the computed perspective and scale and the plurality of views of the scene; and displaying the representation of the object on the display using the perspective and the scale such that, when the eyes of the viewer are at the location and the gaze is in the direction indicated in the data received from the sensor, the representation of the object is displayed with visual verisimilitude to the viewer.

2. The method of claim 1, the image data being video data, and the processing of the image data and the displaying of the representation of the object are performed in real-time.

3. The method of claim 1, the data from the at least one sensor being an image received from a camera that is directed at the viewer, the method further comprising computing the direction of gaze of the eyes of the viewer based upon the image received from the camera.

4. The method of claim 3, wherein computing the direction of gaze of the eyes of the viewer comprises:

identifying a head of the viewer in the image;

computing a tilt of the head of the viewer in the image; and determining the direction of the gaze of the eyes of the viewer based upon the computing of the tilt of the head of the viewer in the image.

5. The method of claim 3, wherein computing the direction of gaze of the eyes of the viewer comprises:

identifying a first feature and a second feature of a face of the viewer in the image;

computing data indicative of an orientation of the first feature relative to the second feature responsive to identifying the first feature and the second feature of the face of the viewer; and determining the direction of the gaze of the eyes of the viewer based at least in part upon the data that is indicative of the orientation of the first feature relative to the second feature.

6. The method of claim 3, wherein the display screen is a translucent display screen, and the camera is positioned such that the display is between the viewer and the camera.

7. The method of claim 6, the display being an organic light emitting diode (OLED) display screen.

8. The method of claim 1, further comprising:

receiving audio data, the audio data corresponding in time to the image data; and controlling operation of a directional speaker based upon the data from the at least one sensor to cause the directional speaker to output the audio data toward the viewer.

9. The method of claim 1, further comprising:

detecting a gesture set forth by the viewer based upon the data received from the at least one sensor; and updating content displayed on the display based at least in part upon the gesture detected as being set forth by the viewer.

10. The method of claim 1, further comprising:

detecting a voice command set forth by the viewer based upon the data received from the at least one sensor; and updating content displayed on the display based at least in part upon the voice command detected as being set forth by the viewer.

11. The method of claim 1, further comprising:

receiving data from a treadmill upon which the viewer is moving, wherein the processing of the image data is based upon the data received from the treadmill.

12. A system that facilitates presenting imagery on a display screen, the system comprising:

a processor; and memory that comprises instructions that, when executed by the processor, cause the processor to perform acts comprising:

receiving an image from a camera, the camera configured to capture images of a viewer of the display screen;

computing a location of eyes of the viewer and direction of gaze of the viewer relative to the display screen based upon the image received from the camera;

processing image data based upon the location of the eyes of the viewer and the direction of the gaze of the viewer, the image data comprising a plurality of views of a scene that comprises an object, wherein processing the image data comprises:

selecting a view from the plurality of views of the scene; and scaling the object in the view, wherein the view selected is selected and the object is scaled to cause a representation of the object to be displayed to the viewer with visual verisimilitude when the eyes of the user are at the computed location and gazing in the computed direction; and displaying the representation of the object on the display screen.

13. The system of claim 12, wherein the image data comprises a plurality of video frames from a respective plurality of video cameras.

14. The system of claim 12 comprised by a television.

15. The system of claim 12 comprised by a mobile computing device.

16. The system of claim 12, wherein the display screen is a transparent OLED display screen, and wherein the camera is positioned such that the display screen is between the camera and the viewer.

17. The system of claim 16, the acts further comprising receiving images from a respective plurality of cameras, the display screen positioned between the viewer and the plurality of cameras.

18. The system of claim 12, the acts further comprising transmitting the image to another computing device of another viewer to facilitate creation of a portal between the viewer and the another viewer.

19. A display device, comprising:

a transparent OLED display screen;

a camera positioned to capture an image through the OLED display screen;

memory comprising instructions that, when executed by the processor, cause the processor to perform acts comprising:

receiving the image captured by the camera, the image comprising a viewer of the display device;

computing a location of eyes of the viewer based upon the image captured by the camera;

computing a direction of gaze of the eyes of the viewer based upon the image captured by the camera;

receiving image data that is to be displayed to the viewer on the OLED display screen, the image data comprising a plurality of views of an object;

responsive to computing the location of the eyes of the viewer and the direction of the gaze of the viewer, processing the image data to generate a representation of the object based upon the location of the eyes of the viewer and the direction of the gaze of the viewer, such that when the representation of the object is displayed on the OLED display screen, and when the eyes of the viewer are at the computed location and the gaze of the viewer is in the computed direction, the representation of the object is displayed to the viewer with visual verisimilitude, wherein processing the image data comprises selecting a view from the plurality of views based upon the location of the eyes of the viewer and the direction of the gaze of the viewer; and displaying the representation of the object on the OLED display screen until one of the location of the eyes of the viewer alters or the direction of the gaze of the viewer alters.

20. The method of claim 1, further comprising:

receiving second data from the at least one sensor;

determining, based upon the second data, that at least one of the location of eyes of the viewer relative to the display or the direction of gaze of the eyes of the viewer has changed;

computing, based upon the second data, a perspective and a distance of the viewer relative to the display; and displaying a second representation of the object to the viewer with visual verisimilitude.

* * * * *